United States Patent [19]
Wahlberg

[11] 3,874,610
[45] Apr. 1, 1975

[54] POWERED FISHING REEL

[76] Inventor: Eric C. Wahlberg, 32 Eighth St., Stamford, Conn. 06905

[22] Filed: Aug. 7, 1972

[21] Appl. No.: 278,619

Related U.S. Application Data

[63] Continuation-in-part of Ser. No. 36,269, May 11, 1970, abandoned.

[52] U.S. Cl.. 242/84.1 A, 242/84.21 A, 242/84.5 R
[51] Int. Cl. .................. A01k 89/00, A01k 89/02
[58] Field of Search... 242/84.1 A, 84.2 G, 84.21 R, 242/84.5 R, 84.21 A, 84.2 R, 84.2 A; 43/21

[56] References Cited
UNITED STATES PATENTS

| | | | |
|---|---|---|---|
| 2,083,927 | 6/1937 | Sinex | 242/84.5 R |
| 2,541,876 | 2/1951 | Lockwood | 43/21 |
| 2,896,874 | 7/1959 | Nurmse | 242/218 |
| 3,195,830 | 7/1965 | Balaguer | 242/84.1 A X |
| 3,252,239 | 5/1966 | Moeller | 242/84.1 A X |
| 3,348,788 | 10/1967 | Vinokur | 242/84.1 A X |
| 3,352,507 | 11/1967 | Boussageon | 242/84.21 R |
| 3,411,230 | 11/1968 | Hopper | 242/84.2 A X |
| 3,437,282 | 4/1969 | Honkonen et al. | 242/84.21 R |
| 3,459,387 | 8/1969 | Miyamae | 242/84.1 A X |

Primary Examiner—Billy S. Taylor
Attorney, Agent, or Firm—Alfred E. Miller

[57] ABSTRACT

A self-contained powered fishing reel having an auxiliary manual operating mechanism. The reel, motor, drive mechanism, power source, and power connections may be contained as a complete unit in a housing which may be selectively mounted on any fishing pole of standard design. The reel includes a flyer and a spool and is associated with a tension sensing assembly which connects or disconnects the power source depending upon the line tension. The flyer normally rotates until tension is built up because of a fish on the line. When a predetermined line tension occurs, the flyer is moved axially in one direction to de-activate a switch and disconnect the power source. The fish line becomes slack while the flyer moves axially in another direction by spring force to activate the switch and connect the power source. Thus, the flyer rotates and winds the line on the spool thereby taking up the slack and again building up tension on the fish line.

9 Claims, 11 Drawing Figures

Eric C. Wahlberg 3,874,610

POWERED FISHING REEL

This invention is a continuation-in-part of my application, Ser. No. 36,269, filed May 11, 1970, now abandoned.

The present invention relates to apparatus used in fishing and specifically to reels and the operation of such reels.

The present reels are hand operated and allow the use of only one hand for the handling of the rod. By providing power operation of the reel, both hands are available to handle the rod.

Power operation of the reel could be useful in the fishing art of trolling where the slow reeling in of the line is desirable.

It is an object of this invention to provide a powered fishing reel.

It is a further object of this invention to provide a powered fishing reel which is self-contained in a housing including motive power and power source together with auxiliary emergency operating mechanism in case of power failure.

It is a further object of this invention to provide a powered fishing reel which can be operated in both directions and which has a force limiting device.

Other objects and features of the invention will be explained in the following description and claims and illustrated in the accompanying drawings, which disclose by way of example, the principles of the present invention in which FIG. 1 is a side view of the assembly of the reel apparatus of the present invention.

DESCRIPTION OF THE PREFERRED EMBODIMENT

The present day fishing reels are manually operated and consist of a reel, gearing, a crank attached to the shaft of the gearing, and a casing with a mounting foot attached for mounting the assembly to a fishing rod.

In the present invention, the proposed reel having powered gearing and controls for line tension and reeling is shown in FIGS. 1–9.

Figures 1, 2:
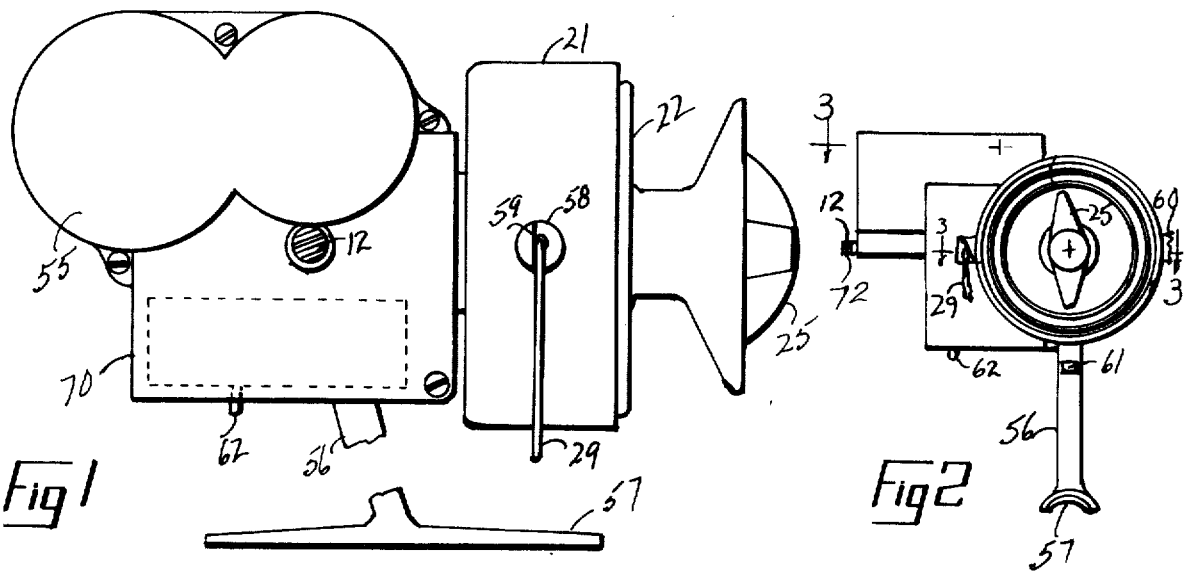
FIG. 2 is a front view of the reel assembly.

In FIG. 1, there are shown battery and motor housing 55, support post 56, mounting foot 57 connected to housing portion 71, manual operation shaft 12, flyer 21, spool 22, line guide 29, line guide mounting 58, and switch actuating button 62.

In FIG. 2, there is shown a front view of the reel with a tension control knob 25, line guide 29, mounting foot 57, manual drive shaft 12 and housing 71. The manual operation shaft 12 is shown having screw threads 72 for being screw-connected to a crank handle (not shown).

Figures 3, 4, 5, 6, 7, 8, 9:
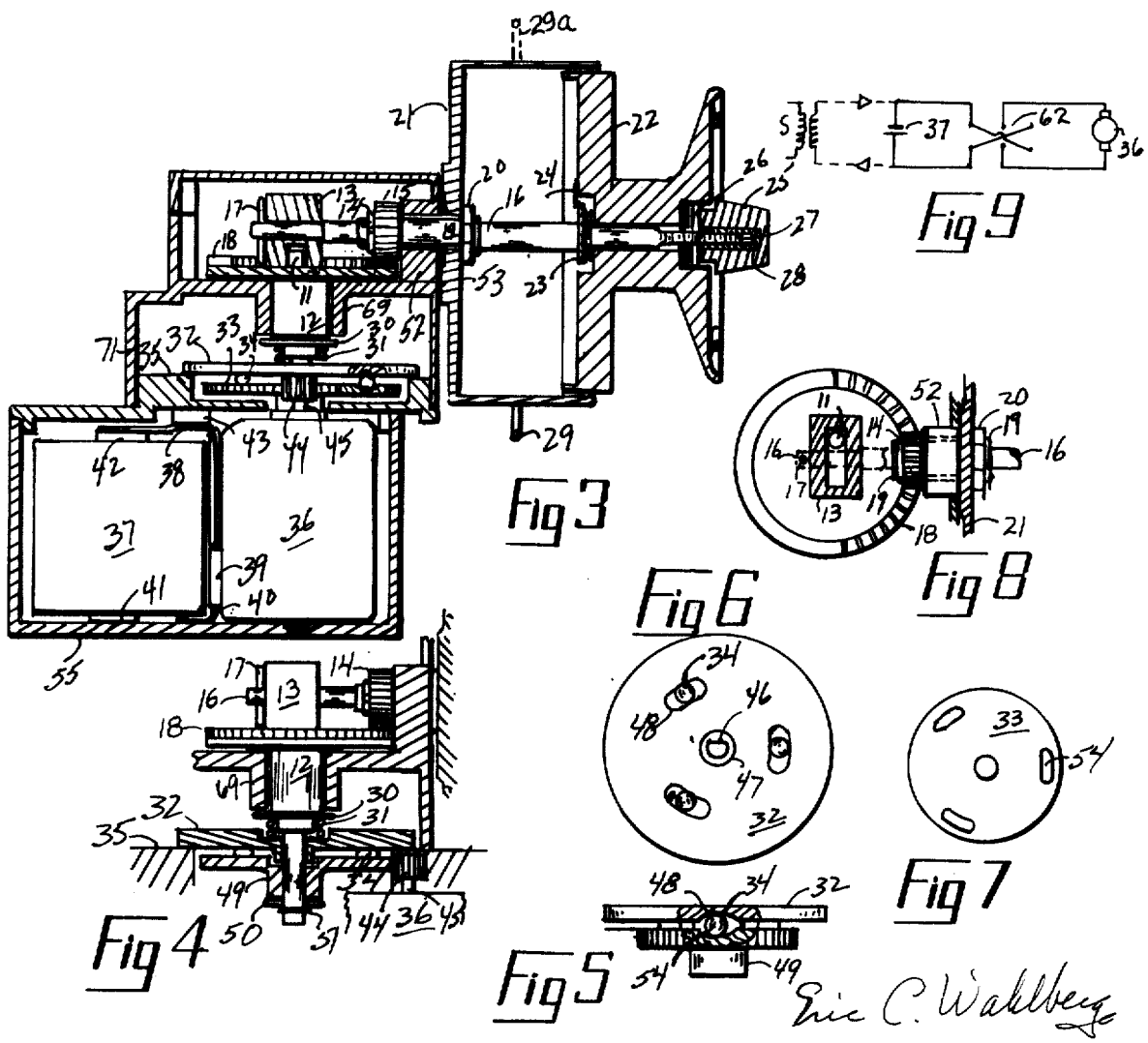
FIG. 3 is a section of the reel assembly taken along line 3—3 of FIG. 2.
FIG. 4 is a view of the clutch-brake drive assembly.
FIG. 5 is a view of the clutch-brake disc assembly.
FIG. 6 is a view of the brake disc.
FIG. 7 is a view of the drive disc or gear.
FIG. 8 is a view of a portion of drive gearing.
FIG. 9 is a circuit diagram of the invention.

Referring to FIG. 3, the motor 36 with drive shaft 45, gear 44, and electrical connection block 39 are shown together with energy source 37 having terminals 42 and 41 connected to the motor by means of lead 38 mounted on insulator 43 and case 55, respectively. The gear 44 is shown co-operating with gear disc 33 independently rotatably mounted to shaft 12 and co-operating with brake disc 32 by means of balls 34 and slidably mounted to drive shaft 12. A bias spring 31 provides the pressure required to assure contact of brake disc 32 on brake surface 35 when motor 36 is not driving the disc 32. Shaft 12 is an integral part of gear 18 and is mounted in hub 69. The gear 18 co-operates with gear 15 mounted on shaft 19 which is mounted for rotation in mounting block 52. The shaft 19 is fixed to rotatable flyer 21 by means of nut 20. A cam block 13 co-operating with a cam pin 11 mounted on gear 18 is positioned on a shaft 16 which is limited to longitudinal motion by a flat portion on the shaft co-operating with a similar flat portion in the mounting cam block 13. The cam block 13 is positioned on the shaft 16 between a shoulder on shaft 16 and a pin 17 inserted in the end of the shaft 16. The spool 22 is mounted on the shaft 16 between ratchet gear 23 and tensioning nut 27 which co-operates with screw thread 28 to provide pressure friction on washers 26. Line guide 29 is shown in normal line guide position by solid lines and in non-guide position in dotted position 29a (FIG. 3). As further illustrated in FIG. 11, a biasing spring 82 is shown positioned between the gear 15 and mounting block 52.

As seen in FIG. 4, the assembly of the drive arrangement is shown in which motor gear 44 co-acts with gear 33 rotatably mounted on shaft 12. The longitudinal motion of the gear 33 is limited by washer 50 and snap ring 51. Balls 34 co-operate between gear disc 33 and brake disc 32. Brake disc 32 is slidably mounted to shaft 12. A bias spring 31 is mounted on shaft 12 between the brake disc 32 and washer 30. Shaft 12 is mounted in hub 69. Gear 18 is an integral part of shaft 12. The cam block 13 is mounted to shaft 16 by means of pin 17.

FIG. 5 shows the clutch-brake assembly wherein ball 34 is shown located in slanted grooves 54 and 48 in the disc 49 and brake disc respectively. FIG. 6 illustrates the ball groove side of the brake disc 32 having three sloping grooves 48 shown equidistantly spaced on the surface about hub 47 which has a partial hole 46 to match flat on shaft 12. FIG. 7 shows the ball groove side of the gear disc 33 having three sloping grooves 54 shown equidistantly spaced around the shaft mounting hole and matching those on brake disc 32 of FIG. 6.

FIG. 8 shows gear 18 of shaft 12 having integral cam pin 11 which co-operates with cam block 13 which is mounted on shaft 16 shown in dotted lines since it is located above the section shown.

FIG. 9 is a circuit diagram in which switch 62 is used to connect battery 37 to motor 36 for bi-directional operation. In place of battery 37, a transformer and diodes may be used to provide power from an electrical source, such as an AC outlet.

Figure 10:
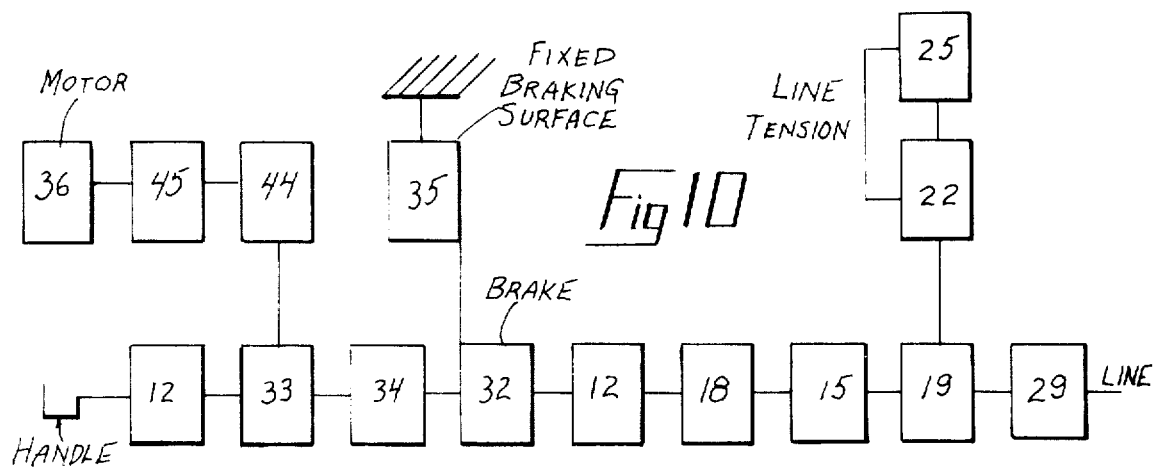
FIG. 10 is a diagrammatic view of the entire assembly and illustrates the co-action of the elements.
Figure 11:
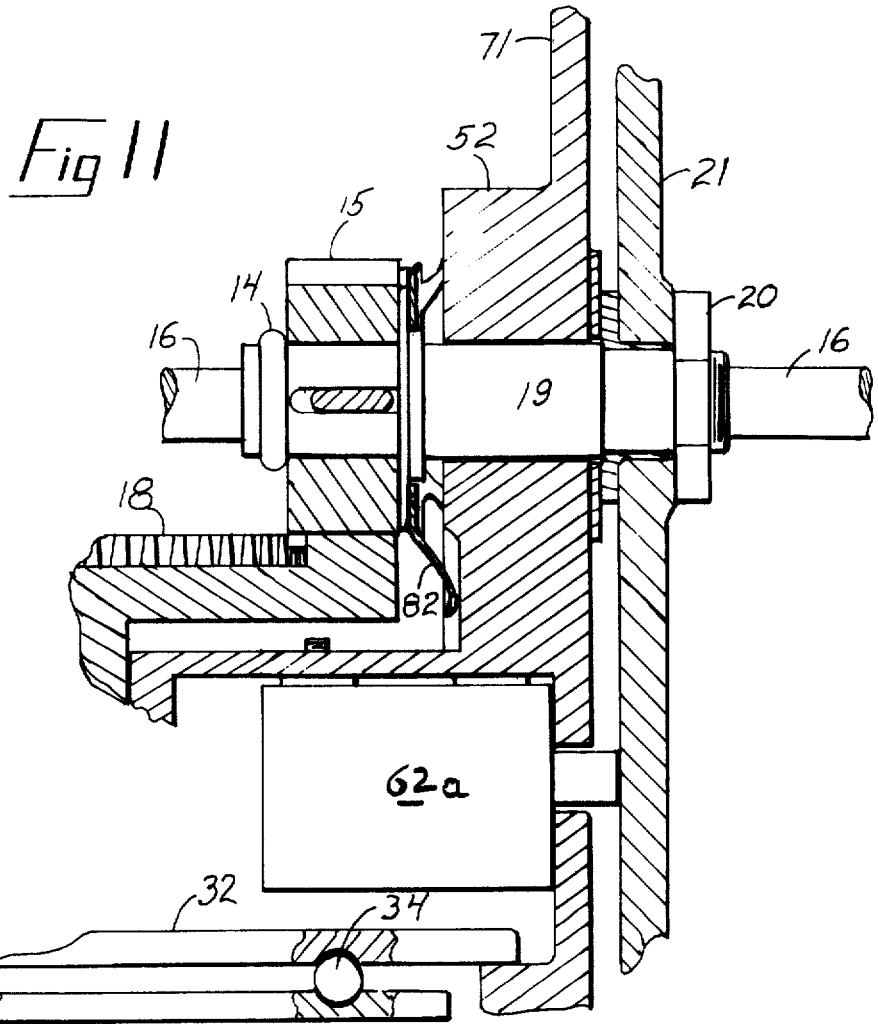
FIG. 11 is an enlarged fragmentary side elevation view of a part of the flyer and adjacent housing showing the switch arrangement.

FIG. 10 is a block diagrammatic view showing the invention with the blocks marked corresponding to the various elements of the assembly. Summarizing the functions of my assembly, brake disc 32 is in contact with the stationary brake surface 35 at all times except when gear 33 is rotated either by motor 36 through gear 44 or an auxiliary manual handle is applied to the end of shaft 12. Therefore, as seen in FIG. 11, any action of tension on line guide 29 will move flyer 21 axially by means of shaft 19 acting against spring 82. This movement causes switch 62a to open. When tension on line guide 29 is released, spring 82 causes flyer 21 to move back axially and resume its normal position thereby closing switch 62a. This action applies power to the motor 36 and causes the latter to rotate, thereby releasing brake 32 from brake surface 35 through the separating action of the balls 34.

The operation of the reel is such that as switch actuator button 62 is pushed, the battery 37 is electrically connected to motor 36 causing motor 36 to start. Gear 44 on shaft 45 of the motor is rotated. Gear 44 causes gear 33 to start to turn on shaft 12. Since brake disc 32 is in contact with brake surface 35, it will be stationary until the balls 34 roll up the inclines of grooves 48 and 54 of the respective discs. As these balls 34 start up the inclines the brake disc will rise from the brake surface 35 against bias spring 31. The brake disc then rotates with gear disc 33. The rotation of brake disc 32 causes shaft 12 and gear 18 to turn. The turning of gear 18 causes gear 15 to turn and consequently tubular shaft 19 and flyer 21 to rotate. At the same time, cam pin 11 is rotated with gear 18. This causes cam block 13 to oscillate back and forth in time with rotation of gear 18. The oscillation of cam block 13 causes the shaft 16 to oscillate in a direction along the longitudinal axis of the shaft. Since spool 22 is fastened to shaft 16 by the rotational torque limiting knob 25, the flyer operates longitudinally in synchronism with the rotation of gear 18. When the motor 36 stops due to the disconnection of the battery 37 by the opening of the switch 62, brake disc 32 will settle onto brake surface 35 inasmust as the balls 34 settle back to the bottom of grooves 48 and 54. This causes the stopping of brake disc 32 and, consequently, the motion of the spool 22 and flyer 21. If the force of the pull on the line being wound on the spool 22 through line guide 29 is greater than the limiting torque set by knob 25, the spool 22 will rotate enough to feed line to relieve the force to one which is below the torque set.

Should the battery 37 fail to provide the required amount of energy to run the motor 36, a crank handle may be applied to shaft 12, FIG. 2, and thereby provide motion to flyer 21 and spool 22 in the same manner as described for motor operation.

It will be observed from FIG. 3 that the motor 36, energy source 37, and the driving mechanism therebetween as well as holding brake 32 and associated structure are all mounted in a relatively small housing 71.

Further, it will be noted that the gear 44 is mounted to the motor shaft 45 and meshes with gear disc 33 that is rotatably mounted to shaft 12 and spaced with relation to brake surface 35 in the housing 71. The brake disc 32 is keyed to and slidably mounted on shaft 12. The surface of brake disc 32 and gear 33 facing each other have matching inclined grooves 48 and 54, respectively, with balls 34 held captive in these grooves. The bias spring 31 holds the brake disc 32 against brake surface 35 of housing 71 whenever the motor is stopped, thus holding the flyer 21 in stopped position until the gear disc 32 rotates enough to cause balls 34 to roll up the inclined grooves 48 and 54 to force the brake disc 32 away from brake surface 35 of the housing 71. Furthermore, shaft 12 is rotatably mounted in hub 69 of housing 71. The gear 18 which is attached to shaft 12 is meshed with gear 15 to cause rotation of shaft 16 when the motor is operating. Moreover, a pin 11 on the face of gear 18 co-acts with the cam block 13 which is held against the shoulder of shaft 16 by pin 17. As the gear 18 is rotated, pin 11 oscillates cam block 13 and, as a result, oscillates the shaft 16 within hollow shaft 19 (FIG. 11). Gear 15 is keyed to hollow shaft 19 and rotates the shaft 19 in hub 52 of housing 71 when the motor is running. The shaft 19 is also capable of being axially moved in hub 52. As clearly seen in FIG. 11, spring 82 is mounted between the hub 52 and the gear 15. A ring 14 fits in a groove in the shaft 19 to locate the gear 15 inwardly on the hollow shaft and to provide the bias force of the spring 82. The other end of the hollow shaft has a shoulder against which the flyer 21 is held in a fixed relation by a nut engaged to the threads on the end of the hollow shaft 19. A spool 22 is rotatably mounted to ths shaft 16 and the axial travel of the spool in the flyer is limited by cam 13 and the pin 11 at the other end of the shaft 16. The tension nut 25 is used in conjunction with the friction washers 26 against spool friction surfaces to limit the rotation to any pull above a pre-set friction or tension of the line which normally is below the breaking point of the line. A bail 29 is used to guide the line over the edge of the flyer on to the spool 22 as the spool oscillates in and out of the flyer 21 as dictated by the motion of cam 13 at the other end of the shaft 16. The bail 29 which is hinged to the flyer, may be flipped over to a position as indicated by 29a (FIG. 3) to free the line for unhindered uncoiling from the spool 22 as required in casting.

When the motor is inoperative, the brake 32 holds the flyer in a fixed position. Any tension of the line which does not produce rotation of the spool, that is, does not overcome the predetermined friction set by the tension nut 25, causes an axial movement of the flyer 21 to thereby compress the spring 82 and increase the spacing between the flyer 21 and the housing 71. The switch 62a mounted in the housing 71 senses the position of the flyer 21 relative to housing 71. When the spacing is minimal, the switch 62a connects the motor 36 to power source 37. This causes flyer 21 to be rotated by means of the gearing to wind the line on to the spool to take up the slack in the line until a predetermined tension is built up in the line to cause an increase in the spacing of the flyer 21 from housing 71. The switch 62a then disconnects the motor from the energy source and the brake 32 engages the brake surface 35 to hold the flyer in position. An auxiliary crank may be attached to the end of the shaft 12 which extends out of the end of the housing 71 and held in place by nut engaging threads 72 (FIG. 2). This will allow the apparatus to be operated manually in the same manner as any reel apparatus, should the energy source become inadequate.

The operation is equally effective for either direction of rotation.

The operation of the present reel may be automatically controlled by the tension produced on the flyer by the load on the line. In such a case, and as seen in FIG. 11, the switch 62a monitors the relative position of flyer 21 and housing 70. The flyer 21 is spring biased against the drive housing 70 by means of a spring 82 located between gear 15 and mounting block 52. When the flyer has no load, the flyer moves to a position toward the drive housing 70 thus actuating the switch and causing motor 36 to rotate until a force on the line causes flyer 21 to move away from housing 70 a sufficient distance to de-activate the switch 62a and thus open the circuit to the motor 36. It should be noted that if the force of pull on the line wound around the spool 22 through the line guide 29 is greater than the limiting torque set by the knob 25, the spool 22 will rotate enough to feed the line and relieve the force to one which is below the set torque. Thus, the force of the line is exerted on the line guide 29 first and is longitudinal because it is held by the tension requirement of knob 25. Obviously, since the line guide is mounted on the flyer 21, this force is transmitted to the flyer. Accordingly, when the reel is mounted on the fishing pole and when held against the force on the fishing line, the flyer 21 will move to a limited degree longitudinally away from the housing, as seen in FIG. 11, and against the pressure of the spring 82 located between the gear 15 and the gear mounting block 52. However, when the load is released from the line, the bias spring 82 will cause the flyer 21 to return linearly to its normal position against the housing 70. Obviously, when the flyer is in its normal position, the switch 62a is activated and the energy source to the motor is connected.

In the embodiment shown, line guide 29 may be thrown to position 29a (FIG. 3) in order to allow the line to automatically unreel from spool 22.

The size of the motor and battery to require the desired torque for operation of the reel is dependent on the load to be encountered on the reel due to the line load and to the gear reduction. Should the design load be large, the motor size can be increased in size. The battery can be enlarged and may be designed as a separate unit to be carried over the shoulder or in the pocket with electrical conductors connecting the battery with the reel drive assembly.

What is claimed is:

1. An apparatus used in fishing and removably attachable to any standard fishing pole having a fishing line comprising: a self-contained motor and a reel driven thereby; an energy source for said motor for operating said reel; said reel including a spool and flyer; a tension mechanism having a pre-selected tension setting and being operatively connected to said reel; said flyer being adapted to rotate under normal conditions but to move in a direction along its longitudinal axis when the load on the fishing line exceeds said tension setting; a first means connecting said energy source to said motor; a second means connecting said motor to said reel; and a mechanism mounted on said apparatus for sensing said axial movement of said flyer as a result of the load on said fishing line in order to connect or disconnect said energy source to the motor.

2. The invention as recited in claim 1 wherein said second means includes a coupling device responsive to said motor for operating said reel.

3. The invention as recited in claim 1 wherein said energy source includes a battery.

4. The invention as recited in claim 1 wherein said combination further includes a housing having said motor and said second means housed therein and having said reel rotatably mounted on said housing.

5. The invention as recited in claim 1 wherein said combination further includes a housing having said motor, said first means, said second means, and said energy source mounted therein and having said spool rotatably mounted on said housing.

6. The invention as recited in claim 1 further including an auxiliary manual motive means adapted for use in place of said motor.

7. The combination as claimed in claim 1 wherein said tension sensing mechanism includes a switch that is responsive to displacement of said flyer by said fish line tension.

8. The invention as recited in claim 1 wherein said combination further includes a housing, said motor and said energy source being located in said housing, said first means connecting the energy source to said motor and said second means connecting the motor to said reel being positioned within said housing, and said reel being mounted on but operable outside of the housing.

9. A self-contained powered fishing reel adapted to be used with any standard fishing pole having a fishing line comprising a housing, a motor in said housing, a flyer adapted to be rotated by said motor and mounted forward of said housing, a spool adapted to move axially relative to said rotating flyer, a drive mechanism operatively connected to said motor for said spool and flyer, a housing for said drive mechanism, an energy source for said motor, a tension mechanism having a pre-selected tension setting and being operatively connected to said flyer, a switch for said energy source, yieldable means operatively connected between said housing and flyer wherein said flyer is biased in the direction of said housing and capable of limited axial movement, said flyer in a biased condition normally closing said switch to activate said energy source, said tension mechanism being operated by said flyer upon the limited axial movement therof as a result of fish line tension to open said switch ans to de-activate said energy source.

* * * * *